United States Patent
Sun et al.

(10) Patent No.: US 11,205,235 B2
(45) Date of Patent: Dec. 21, 2021

(54) METHOD AND APPARATUS FOR ESTIMATING THROUGHPUT OF PRODUCTION LINE

(71) Applicant: ABB Schweiz AG, Baden (CH)

(72) Inventors: Heqing Sun, Shanghai (CN); Cheng Li, Shanghai (CN); Hao Gu, Shanghai (CN); Xinyu Fang, Shanghai (CN)

(73) Assignee: ABB Schweiz AG, Baden (CH)

(*) Notice: Subject to any disclaimer, the term of this patent is extended or adjusted under 35 U.S.C. 154(b) by 41 days.

(21) Appl. No.: 16/585,116

(22) Filed: Sep. 27, 2019

(65) Prior Publication Data

US 2020/0027173 A1 Jan. 23, 2020

Related U.S. Application Data

(63) Continuation of application No. PCT/CN2017/081805, filed on Apr. 25, 2017.

(51) Int. Cl.
*G06Q 10/06* (2012.01)
*G06Q 50/04* (2012.01)
*G06F 17/18* (2006.01)

(52) U.S. Cl.
CPC ............ *G06Q 50/04* (2013.01); *G06F 17/18* (2013.01); *G06Q 10/06393* (2013.01)

(58) Field of Classification Search
CPC ... G06Q 50/04; G06Q 10/06393; G06F 17/18
USPC ........................................ 705/7.39
See application file for complete search history.

(56) References Cited

U.S. PATENT DOCUMENTS

| | | | |
|---|---|---|---|
| 7,054,702 B1* | 5/2006 | Barto | G05B 19/41865 700/100 |
| 7,136,825 B2* | 11/2006 | Araki | G06Q 10/06311 705/7.16 |
| 7,323,362 B2 | 1/2008 | Odegard et al. | |
| 8,041,441 B2* | 10/2011 | Izumi | G05B 19/41865 700/101 |
| 9,383,747 B2* | 7/2016 | Nussbaumer | B28B 5/04 |
| 10,054,936 B2* | 8/2018 | Gobalakrishnan | G06Q 10/0637 |
| 10,559,043 B1* | 2/2020 | Schlintl | G06Q 50/04 |
| 2001/0027406 A1* | 10/2001 | Araki | G06Q 10/063116 705/7.16 |
| 2006/0136085 A1 | 6/2006 | Steinhilper et al. | |

(Continued)

FOREIGN PATENT DOCUMENTS

| | | |
|---|---|---|
| CN | 1878713 A | 12/2006 |
| CN | 101055635 A | 10/2007 |

(Continued)

OTHER PUBLICATIONS

Michael et al "Designing and implementation of an intelligent manufacturing system", Dec. 2011, Department of Informatics of University of Porto, 5Faculty of Engineering of University of Porto (Portugal). pp. 1-16 (Year: 2011).*

(Continued)

*Primary Examiner* — Romain Jeanty
(74) *Attorney, Agent, or Firm* — Greenberg Traurig, LLP

(57) ABSTRACT

The present application relates to a method and apparatus for estimating throughput of a production line, the method including: a data obtaining step, a bottleneck work station selecting step, a first correcting step, a second correcting step as well as a throughput estimating step.

8 Claims, 2 Drawing Sheets

(56) References Cited

U.S. PATENT DOCUMENTS

2007/0244591 A1    10/2007   Ishibashi et al.
2015/0227138 A1*   8/2015   Gultekin .......... G05B 19/41885
                                                                                                            700/111

FOREIGN PATENT DOCUMENTS

| CN | 102183935 A | 9/2011 | |
|---|---|---|---|
| JP | H04235433 A | 8/1992 | |
| WO | 02/50699 A1 | 6/2002 | |
| WO | WO-2014137205 A1 * | 9/2014 | ............. F16H 55/08 |

OTHER PUBLICATIONS

Qian et al "Determining numbers of workstations and operators for a linear walking-worker assembly line", Sep. 2010, International Journal of Computer Integrated Manufacturing, pp. 1-31 (Year: 2010).*

Jakob "Analysis and Management of Bottlenecks in Supply Networks", Dec. 2015, University of Stavanger, pp. 1-493 (Year: 2015).*

Intellectual Property Office of the P.R. China, International Search Report & Written Opinion issued in corresponding Application No. PCT/CN2017/081805, dated Jan. 16, 2018, 8 pp.

European Patent Office, Extended European Search Report issued in corresponding European applicatiion No. 17906874.7, dated Aug. 11, 2020, 8 pp.

Office Action dated Aug. 3, 2021 for Europe Patent Application No. 17906874.7.

* cited by examiner

| | Process Time Parameter | | Travel Time Parameter | | Number of Buffers |
|---|---|---|---|---|---|
| | Mean value | Standard Deviation | Station-to-Station Time | Buffer-to-Station Time | |
| Work Station1 | 11.02 | 5.61 | 1 | 1 | 0 |
| Work Station2 | 5.56 | 3.52 | 3 | 3 | 0 |
| Work Station3 | 10.39 | 8.77 | 4 | 11 | 1 |
| Work Station4 | 12.39 | 1.10 | 4 | 27.5 | 1 |
| Work Station5 | 11.59 | 8.32 | 4 | 4 | 0 |
| Work Station6 | 14.38 | 12.07 | 4 | 6 | 0 |
| Work Station7 | 8.82 | 7.84 | 4 | 6 | 1 |
| Work Station8 | 13.30 | 7.44 | 3 | 10 | 1 |
| Work Station9 | 8.48 | 11.12 | 4 | 4 | 0 |

METHOD AND APPARATUS FOR ESTIMATING THROUGHPUT OF PRODUCTION LINE

FIELD OF INVENTION

The present invention relates to the field of throughput estimating, and more specifically, to a method and apparatus for estimating throughput of a production line.

BACKGROUND OF INVENTION

Production lines can be used for processing and manufacturing products. Typically a production line consists of multiple work stations, each of which can complete at least one production process. The work station may be an industrial robot, a dedicated machine, or a worker.

During designing a production line, estimating throughput of the production line is one of important tasks. Besides, in production management there is also a need to estimate throughput so as to make reasonable production arrangements.

An existing method for throughput estimating is to simulate and build, on a computer, a production line whose throughput needs to be estimated and then to obtain throughput of the production line from the process in which simulated products flow on the production line.

A main disadvantage of the method is when setting up such simulation environment on a computer, the configuration is rather complex and a long time will be consumed.

Therefore, there is a need to produce a method and apparatus for estimating throughput of a production line, which can reach an estimated result only with simple data input.

SUMMARY OF INVENTION

It is an objective of the present invention to provide a method and apparatus for estimating throughput of a production line.

One embodiment of the present invention provides a method for estimating throughput of a production line, the method comprising: obtaining a process time parameter of each of the multiple work stations, a travel time parameter between two neighboring work stations, as well as the number of buffers between the two neighboring work stations; selecting a bottleneck work station in the production line according to a preset criterion; calculating bottleneck sub-throughput of a bottleneck subline, upstream sub-throughput of an upstream subline and downstream sub-throughput of a downstream subline according to the process time parameter, the travel time parameter and the number of buffers, wherein the bottleneck subline includes the bottleneck work station, at least one upstream work station of the bottleneck work station, and at least one downstream work station of the bottleneck work station, the upstream subline comprises a first work station of the bottleneck subline and at least one upstream work station of the first work station, the downstream subline comprises a last work station of the bottleneck subline and at least one downstream work station of the last work station; calculating a corrected process time of the first work station of the bottleneck subline according to the process time parameter of the first work station, the bottleneck sub-throughput and the upstream sub-throughput; calculating a corrected process time of the last work station of the bottleneck subline according to the process time parameter of the last work station, the bottleneck sub-throughput and the downstream sub-throughput; and calculating the bottleneck sub-throughput as the throughput of the production line according to the corrected process time of the first work station and the corrected process time of the last work station.

Another embodiment of the present invention provides an apparatus for estimating throughput of a production line, the apparatus comprising: a data obtaining module for obtaining a process time parameter of each of the multiple work stations, a travel time parameter between two neighboring work stations, as well as the number of buffers between the two neighboring work stations; a bottleneck work station selecting module for selecting a bottleneck work station in the production line according to a preset criterion; a sub-throughput calculating module for calculating bottleneck sub-throughput of a bottleneck subline, upstream sub-throughput of an upstream subline and downstream sub-throughput of a downstream subline according to the process time parameter, the travel time parameter and the number of buffers, wherein the bottleneck subline includes the bottleneck work station, at least one upstream work station of the bottleneck work station, and at least one downstream work station of the bottleneck work station, the upstream subline comprises a first work station of the bottleneck subline and at least one upstream work station of the first work station, the downstream subline comprises a last work station of the bottleneck subline and at least one downstream work station of the last work station; a first correcting module for calculating a corrected process time of the first work station of the bottleneck subline according to the process time parameter of the first work station, the bottleneck sub-throughput and the upstream sub-throughput; a second correcting module for calculating a corrected process time of the last work station of the bottleneck subline according to the process time parameter of the last work station, the bottleneck sub-throughput and the downstream sub-throughput; and a throughput estimating module for calculating the bottleneck sub-throughput as the throughput of the production line according to the corrected process time of the first work station and the corrected process time of the last work station.

BRIEF DESCRIPTION OF THE DRAWINGS

A better understanding of the present invention may be obtained from description of embodiments of the present invention, with reference to the accompanying drawings, wherein.

DETAILED DESCRIPTION OF EMBODIMENTS

Description is presented below to specific embodiments of the present invention. It should be noted while describing these embodiments, the specification might not thoroughly describe all features of actual embodiments for the sake of brevity. It should be understood during actual implementation of any one embodiment, just as in the course of any one engineering project or design project, in order to achieve specific objectives of developers and satisfy system-related or business-related restrictions, usually a variety of concrete policies will be made, which also leads to changes from one embodiment to another embodiment. In addition, it may be understood though efforts made during such development might be complicated and tedious, to those of ordinary skills in the art related to content disclosed by the present invention, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present invention clearer, the technical solution of the present invention will be clearly and completely described with reference to the specific embodiments and the accompanying drawings of the present invention. Obviously, the embodiments to be described are merely part of embodiments of the present invention, rather than all embodiments. Based on the embodiments of the present invention, all other embodiments as made by those of ordinary skills in the art without the exercise of any inventive skill should fall in the protection scope of the present invention.

First of all, the embodiments of the present invention discloses a method for estimating throughput of a production line that comprises multiple work stations.

Figures 1, 2:
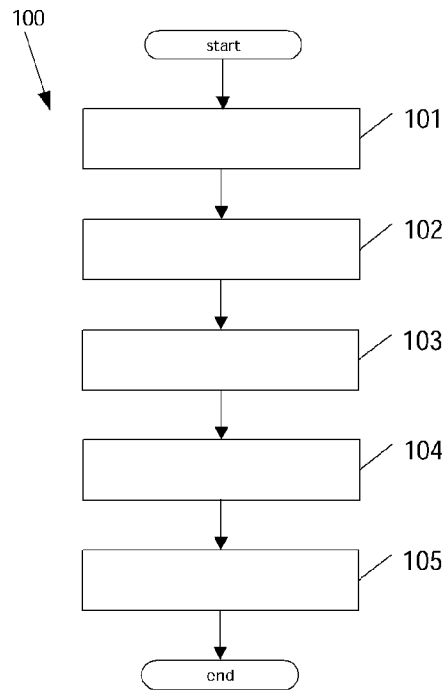
FIG. 1 schematically shows a flowchart of a method for estimating throughput of a production line according to one embodiment of the present invention.
FIG. 2 schematically shows obtained input data according to one embodiment of the present invention.

With reference to FIG. 1 this figure schematically shows a flowchart of a method 100 for estimating throughput of a production line according to one embodiment of the present invention. As shown in FIG. 1, the method 100 may comprise steps 101 to 106.

In step 101, a process time parameter of each of the multiple work stations, a travel time parameter between two neighboring work stations and the number of buffers between two neighboring work stations are obtained.

According to one embodiment of the present invention, the process time parameter comprises a mean value of process times and a standard deviation of process times, and the travel time parameter between the two neighboring work stations comprises a station-to-station travel time between the two neighboring work stations and a buffer-to-station travel time between the work station and the buffer before it.

As shown in FIG. 2, take a production line consisting of 9 work stations as one example. A mean value of process times and a standard deviation of process times of each of multiple work stations may be obtained, and also a station-to-station travel time S2S between two neighboring work stations and a buffer-to-station travel time B2S between the work station and the buffer before it may be obtained.

These data may come from historical experience or by simulations on a single work station.

In step 102, a bottleneck work station in the production line is selected according to a preset criterion.

The bottleneck work station refers to a work station that has a significant impact on throughput of the entire production line. According to one embodiment of the present invention, the bottleneck work station may be one work station that has the greatest impact on throughput of the entire production line, or several work stations that have a great impact on throughput of the entire production line.

The preset criterion may be a criterion defined by the process time parameter and travel time parameter of the work station as obtained in step 101, a criterion defined by production costs, or a criterion defined by users' sensitivity.

In a word, by taking data obtained in step 101 as input, a certain parameter of each work station can be calculated. Based on the value of the parameter, the bottleneck work station may be selected from the production line with any existing method for selecting a bottleneck work station.

In step 103, bottleneck sub-throughput of a bottleneck subline, upstream sub-throughput of an upstream subline, as well as downstream sub-throughput of a downstream subline are calculated according to the process time parameter, the travel time parameter and the number of buffers; wherein the bottleneck subline includes the bottleneck work station, at least one upstream work station of the bottleneck work station, and at least one downstream work station of the bottleneck work station, the upstream subline comprises a first work station of the bottleneck sublime and at least one upstream work station of the first work station, the downstream subline comprises a last work station of the bottleneck subline and at least one downstream work station of the last work station.

A work station before the bottleneck work station in the production process is called upstream work station, and a work station after the bottleneck work station in the production process is called downstream work station. A workstation receiving parts from outside the line/sub-line is called first work station, and a workstation outputs the parts to the outside of the line/sub-line is called last work station.

Figure 3:
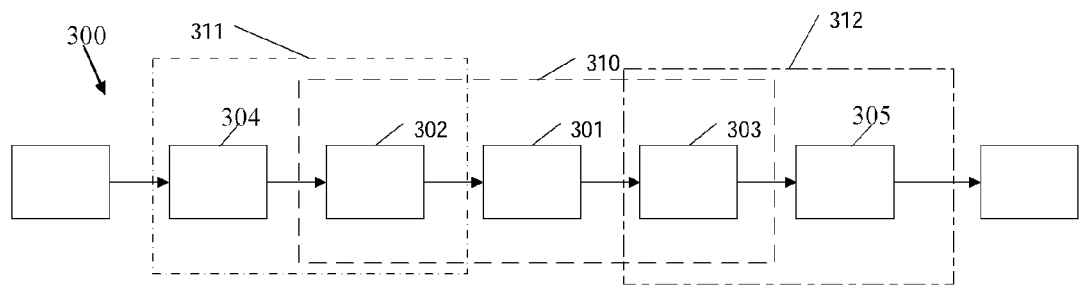
FIG. 3 schematically shows a bottleneck subline, an upstream subline and a downstream subline in a production line according to one embodiment of the present invention.

FIG. 3 schematically shows a bottleneck subline, an upstream subline and a downstream subline in a production line 300 according to one embodiment of the present invention. As shown in FIG. 3, after the bottleneck work station is selected, according to one embodiment of the present invention, the bottleneck work station 301, an upstream work station 302 of the bottleneck work station 301, together with a downstream work station 303 of the bottleneck work station 301 may be regarded as one subline, i.e. a bottleneck subline 310. In the bottleneck subline 310, workstation 302 is the first workstation, and work station 303 is the last work station. Of course, the bottleneck subline may further include several upstream work stations and/or several downstream work stations.

Likewise, the first work station 302 and at least one upstream work station 304 of the first upstream work station 302 may be regarded as one subline, i.e. an upstream subline 311. In addition, the last work station 303 and at least one downstream work station 305 of the last work station 303 may be regarded as one subline, i.e. a downstream subline 312.

Regarding the bottleneck subline 310, the upstream subline 311 and the downstream subline 312, throughput of each of these sublines may be calculated according to the process time parameter, the travel time parameter and the number of buffers as obtained in step 101.

Since these sublines include a few number of work stations, their throughput may be fast calculated with any existing method for calculating throughput.

In step 104, a corrected process time of the first work station is calculated according to the process time parameter of the first work station, the bottleneck sub-throughput and the upstream sub-throughput.

Figure 4:
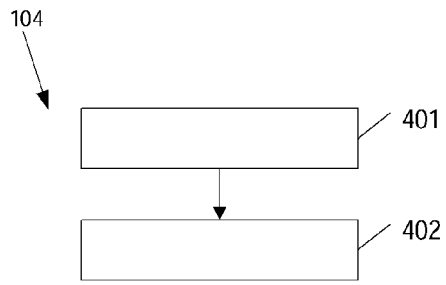
FIG. 4 schematically shows a flowchart of calculating a corrected process time of a first work station during estimating throughput of a production line according to one embodiment of the present invention.

According to one embodiment of the present invention, with reference to FIG. 4, this figure schematically shows a flowchart of calculating a corrected process time of the first work station during estimating throughput of the production line according to one embodiment of the present invention. As shown in FIG. 4, step 104 may further include substeps 401 and 402.

In substep 401, a first absolute value of a difference between a process time of the upstream subline and a process time of the bottleneck subline is calculated according to a process time of the first work station, the bottleneck sub-throughput and the upstream sub-throughput.

In substep 402, the first absolute value is added to the process time of the first work station so as to obtain a corrected process time of the first work station.

According to one embodiment of the present invention, the corrected process time of the first work station 302 may be calculated using Equation (1) below:

$$T'_{i-1,pro} = T_{i-1,pro} + \left| \frac{3600}{\rho_{up}} - \frac{3600}{\rho_{BN}} \right| \qquad (1)$$

wherein $T_{i-1,pro}$ is the process time (second) of the first work station 302 as obtained in step 101, $\rho_{up}$ is the sub-throughput (unit per hour) of the upstream subline as obtained in step 103, $\rho_{BN}$ is the sub-throughput (unit per hour) of the bottleneck subline as obtained in step 103, $$\left| \frac{3600}{\rho_{up}} - \frac{3600}{\rho_{BN}} \right|$$

is the first absolute value as obtained in substep 401, and $T_{i-1,pro}'$ is the corrected process time (second) of the first work station 302.

In step 105, a corrected process time of the last work station is calculated according to a process time of the last work station, the bottleneck sub-throughput and the downstream sub-throughput.

Figure 5:
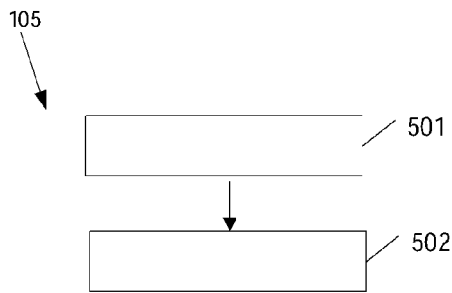
FIG. 5 schematically shows a flowchart of calculating a corrected process time of a last work station during estimating throughput of a production line according to one embodiment of the present invention.

According to one embodiment of the present invention, with reference to FIG. 5, this figure schematically shows a flowchart of calculating a corrected process time of the last work station during estimating throughput of the production line according to one embodiment of the present invention. As shown in FIG. 5, step 105 may further include substeps 501 and 502.

In substep 501, a second absolute value of a difference between a process time of the downstream subline and a process time of the bottleneck subline is calculated according to a process time of the last work station, the bottleneck sub-throughput and the downstream sub-throughput.

In substep 502, the second absolute value is added to the process time of the last work station so as to obtain a corrected process time of the last work station.

According to one embodiment of the present invention, the corrected process time of the last work station may be calculated using Equation (2) below:

$$T'_{i+1,pro} = T_{i+1,pro} + \left| \frac{3600}{\rho_{down}} - \frac{3600}{\rho_{BN}} \right| \qquad (2)$$

wherein $T_{i+1,pro}$ is the process time (second) of the last work station 303 as obtained in step 101, $\rho_{down}$ is the sub-throughput (unit per hour) of the downstream subline as obtained in step 103, $\rho_{BN}$ is the sub-throughput (unit per hour) of the bottleneck subline as obtained in step 103, $$\left| \frac{3600}{\rho_{down}} - \frac{3600}{\rho_{BN}} \right|$$

is the second absolute value as obtained in substep 403, and $T_{i+1,pro}'$ is the corrected process time (second) of the last work station 303.

In step 106, the bottleneck sub-throughput is calculated as the throughput of the production line according to the corrected process time of the first work station and the corrected process time of the last work station.

After completing steps 104 and 105, the process times of the first work station and the last work station as obtained in step 101 have been actually corrected. Thereby, in step 106 the sub-throughput of the bottleneck subline may be re-calculated using the corrected process times of the first work station and the last work station by means of the method in step 102. Furthermore, the sub-throughput is used as the estimated throughput of the entire production line.

Description has been presented to a method for estimating throughput of a production line according to the embodiments of the present invention. With the method, throughput of a production line consisting of a number of work stations can be estimated accurately where only a small amount of simple data input is provided.

The present invention further provides an apparatus for estimating throughput of a production line that may comprise multiple work stations.

Figure 6:
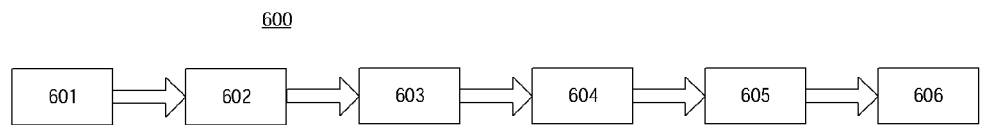
FIG. 6 schematically shows a block diagram of an apparatus for estimating throughput of a production line according to one embodiment of the present invention.

With reference to FIG. 6, this figure schematically shows a block diagram of an apparatus 600 for estimating throughput of a production line according to one embodiment of the present invention.

As shown in FIG. 6, the apparatus 600 may comprise: a data obtaining module 601 for obtaining a process time parameter of each of the multiple work stations, a travel time parameter between two neighboring work stations, as well as the number of buffers between the two neighboring work stations; a bottleneck work station selecting module 602 for selecting a bottleneck work station in the production line according to a preset criterion; a sub-throughput calculating module 603 for calculating bottleneck sub-throughput of a bottleneck subline, upstream sub-throughput of an upstream subline and downstream sub-throughput of a downstream subline according to the process time parameter, the travel time parameter and the number of buffers, wherein the bottleneck subline includes the bottleneck work station, at least one upstream work station of the bottleneck work station, and at least one downstream work station of the bottleneck work station, the upstream subline comprises a first work station of the bottleneck subline and at least one upstream work station of the first work station, the downstream subline comprises a last work station of the bottleneck subline and at least one downstream work station of the last work station; a first correcting module 604 for calculating a corrected process time of the first work station of the bottleneck subline according to the process time parameter of the first work station, the bottleneck sub-throughput and the upstream sub-throughput; a second correcting module 605 for calculating a corrected process time of the last work station of the bottleneck subline according to the process time parameter of the last work station, the bottleneck sub-throughput and the downstream sub-throughput; and a throughput estimating module 606 for calculating the bottleneck sub-throughput as the throughput of the production line according to the corrected process time of the first work station and the corrected process time of the last work station According to one embodiment of the present invention, the process time parameter comprises a mean value of process times and a standard deviation of process times, and the travel time parameter between the two neighboring work stations comprises a station-to-station travel time between the two neighboring work stations and a buffer-to-station travel time between the work station and the buffer before it.

According to one embodiment of the present invention, the first correcting module 604 may further comprise: a first absolute value calculating module for calculating a first absolute value of a difference between a process time of the upstream subline and a processing time of the bottleneck subline according to a process time of the first work station, the bottleneck sub-throughput and the upstream sub-throughput; and a first adding module for adding the first absolute value to the process time of the first work station to obtain the corrected process time of the first work station.

According to one embodiment of the present invention, the second correcting module 605 may further comprise: a second absolute value calculating module for calculating a second absolute value of a difference between a process time of the downstream subline and a processing time of the bottleneck sublime according to a process time of the last work station, the bottleneck sub-throughput and the downstream sub-throughput; and a second adding module for adding the second absolute value to the process time of the last work station to obtain the corrected process time of the last work station.

Description has been presented to an apparatus for estimating throughput of a production line according to the embodiments of the present invention. With the apparatus, throughput of a production line consisting of a number of work stations can be estimated accurately where only a small amount of simple data input is provided.

The embodiments of the present invention have been illustrated above, but are not intended to limit the present invention. Various variations and changes to the present invention will be apparent to those skilled in the art. Any modification, equivalent replacement, improvement and so on as made under the spirit and principle of the present invention should be included in the scope of the claims of the present invention.

The invention claimed is:

1. A method for estimating throughput of a production line that comprises multiple work stations, the method comprises:

performing a simulation on a computer, the simulation including the acts of obtaining a process time parameter of each of the multiple work stations, a travel time parameter between two neighboring work stations, as well as the number of buffers between the two neighboring work stations;

selecting a bottleneck work station in the production line according to a preset criterion;

calculating bottleneck sub-throughput of a bottleneck subline, upstream sub-throughput of an upstream subline and downstream sub-throughput of a downstream subline according to the process time parameter, the travel time parameter and the number of buffers, wherein the bottleneck subline includes the bottleneck work station, at least one upstream work station of the bottleneck work station, and at least one downstream work station of the bottleneck work station, the upstream subline comprises a first work station of the bottleneck subline and at least one upstream work station of the first work station, the downstream subline comprises a last work station of the bottleneck subline and at least one downstream work station of the last work station;

calculating a corrected process time of the first work station of the bottleneck subline according to the process time parameter of the first work station, the bottleneck sub-throughput and the upstream sub-throughput;

calculating a corrected process time of the last work station of the bottleneck subline according to the process time parameter of the last work station, the bottleneck sub-throughput and the downstream sub-throughput; and calculating the bottleneck sub-throughput as the throughput of the production line according to the corrected process time of the first work station and the corrected process time of the last work station.

2. The method according to claim 1, wherein the process time parameter comprises a mean value of process time parameter comprises a mean value of process times and a standard deviation of process times, and the travel time parameter between the two neighboring work stations comprises a station-to-station travel time between the two neighboring work stations and a buffer-to-station travel time between the work station and the buffer before it.

3. The method according to claim 2, wherein the step of calculating a corrected process time of the first work station further comprises:

calculating a first absolute value of a difference between a process time of the upstream subline and a processing time of the bottleneck subline according to a process time of the first work station, the bottleneck sub-throughput and the upstream sub-throughput; and adding the first absolute value to the process time of the first work station to obtain the corrected process time of the first work station.

4. The method according to claim 2, wherein the step of calculating a corrected process time of the last work station further comprises:

calculating a second absolute value of a difference between a process time of the downstream subline and a processing time of the bottleneck subline according to a process time of the last work station, the bottleneck sub-throughput and the downstream sub-throughput; and adding the second absolute value to the process time of the last work station to obtain the corrected process time of the last work station.

5. An apparatus for estimating throughput of a production line that comprises multiple work stations, the apparatus comprises:
a non-transitory computer-readable memory medium configured store a plurality of modules executable by a computer, the plurality of modules including
a data obtaining module for obtaining a process time parameter of each of the multiple work stations, a travel time parameter between two neighboring work stations, as well as the number of buffers between the two neighboring work stations;
a bottleneck work station selecting module for selecting a bottleneck work station in the production line according to a preset criterion;
a sub-throughput calculating module for calculating bottleneck sub-throughput of a bottleneck subline, upstream sub-throughput of an upstream subline and downstream sub-throughput of a downstream subline according to the process time parameter, the travel time parameter and the number of buffers, wherein the bottleneck subline includes the bottleneck work station, at least one upstream work station of the bottleneck work station, and at least one downstream work station of the bottleneck work station, the upstream subline comprises a first work station of the bottleneck subline and at least one upstream work station of the first work station, the downstream subline comprises a last work station of the bottleneck subline and at least one downstream work station of the last work station;
a first correcting module for calculating a corrected process time of the first work station of the bottleneck subline according to the process time parameter of the first work station, the bottleneck sub-throughput and the upstream sub-throughput;
a second correcting module for calculating a corrected process time of the last work station of the bottleneck subline according to the process time parameter of the last work station, the bottleneck sub-throughput and the downstream sub-throughput; and
a throughput estimating module for calculating the bottleneck sub-throughput as the throughput of the production line according to the corrected process time of the first work station and the corrected process time of the last work station.

6. The apparatus according to claim 5, wherein the process time parameter comprises a man value of process times and a standard deviation of process times, and the travel time parameter between the two neighboring work stations comprises a station-to-station travel time between the two neighboring work stations and a buffer-to-station travel time between the work station and the buffer before it.

7. The apparatus according to claim 6, wherein the first correcting module further comprises:
a first absolute value calculating module for calculating a first absolute value of a difference between a process time of the upstream subline and a processing time of the bottleneck subline according to a process time of the first work station, the bottleneck sub-throughput and the upstream sub-throughput; and
a first adding module for adding the first absolute value to the process time of the first work station to obtain the corrected process time of the first work station.

8. The apparatus according to claim 6, wherein the second correcting module further comprises:
a second absolute value calculating module for calculating a second absolute value of a difference between a process time of the downstream subline and a processing time of the bottleneck subline according to a process time of the last work station, the bottleneck sub-throughput and the downstream sub-throughput; and
a second adding module for adding the second absolute value to the process time of the last work station to obtain the corrected process time of the last work station.

* * * * *